United States Patent [19]

Savage et al.

[11] Patent Number: 4,573,805
[45] Date of Patent: Mar. 4, 1986

[54] METHOD FOR MEASURING TEMPERATURE OF A HYDROCARBON STRATUM SUBJECTED TO RF ELECTROMAGNETIC ENERGY

[75] Inventors: Kerry D. Savage; Donald J. Dowling, both of Houston, Tex.; Vernon L. Heeren, deceased, late of Wayland, Mass., by Dorothy J. Heeren, executrix; Brian C. Considine, Chelmsford, Mass.

[73] Assignee: Texaco Inc., White Plains, N.Y.

[21] Appl. No.: 479,593

[22] Filed: Mar. 28, 1983

[51] Int. Cl.⁴ .................... G01K 13/00; G01V 31/26
[52] U.S. Cl. .................................. 374/136; 250/256; 374/122; 340/870.17
[58] Field of Search .............. 374/136, 137, 122, 124; 324/58 R, 324, 338, 58 B; 73/154; 340/870.17; 166/248

[56] References Cited

U.S. PATENT DOCUMENTS

| | | | |
|---|---|---|---|
| 721,770 | 3/1903 | Zeleny | 340/870.17 X |
| 2,050,128 | 8/1936 | Schlumberger | 73/154 X |
| 2,242,612 | 5/1941 | Leonardon | 324/324 X |
| 2,455,941 | 12/1948 | Muskat et al. | 324/338 |
| 2,524,150 | 10/1950 | Vincent | 374/136 X |
| 2,547,876 | 4/1951 | Krasnow | 374/136 |
| 3,039,355 | 6/1962 | Suter | 340/870.17 X |
| 3,167,714 | 1/1965 | Seling | 374/122 X |
| 3,303,701 | 2/1967 | Matsuura et al. | 340/870.17 X |
| 4,135,579 | 1/1979 | Rowland et al. | 166/248 |
| 4,193,451 | 3/1980 | Dauphine | 166/248 |
| 4,268,818 | 5/1981 | Davis et al. | 340/870.17 X |
| 4,427,941 | 1/1984 | Riedesel Jr. et al. | 324/338 X |
| 4,471,354 | 9/1984 | Smith | 340/870.17 X |

OTHER PUBLICATIONS

"Turbine Telemetry" (IPPS Exhibits), British Communications and Electronics (BEC), p. 192, Mar. 1964, 340-870.17.

Primary Examiner—Daniel M. Yasich
Attorney, Agent, or Firm—Robert A. Kulason; Ronald G. Gillespie

[57] ABSTRACT

A method for measuring temperatures of a hydrocarbon stratum subjected to RF electromagnetic energy includes in one embodiment sensing the temperature at different positions within an inner conductor of an applicator used to radiate the RF electromagnetic energy into the hydrocarbon stratum. In another embodiment, the temperature measurements are made from a borehole which is utilized to obtain hydrocarbon fluids resulting from the retorting of the hydrocarbon stratum in which the sensing is done in different positions within the producing borehole and in the vicinity of the hydrocarbon stratum. Electrical signals representative of the sensed temperatures are provided. The electrical signals are conducted from the sensing positions to the surface of the earth. An RF voltage which combines with the electrical signals is decoupled from the electrical signals. An indication of the temperatures is provided in accordance with the decoupled electrical signals.

11 Claims, 8 Drawing Figures

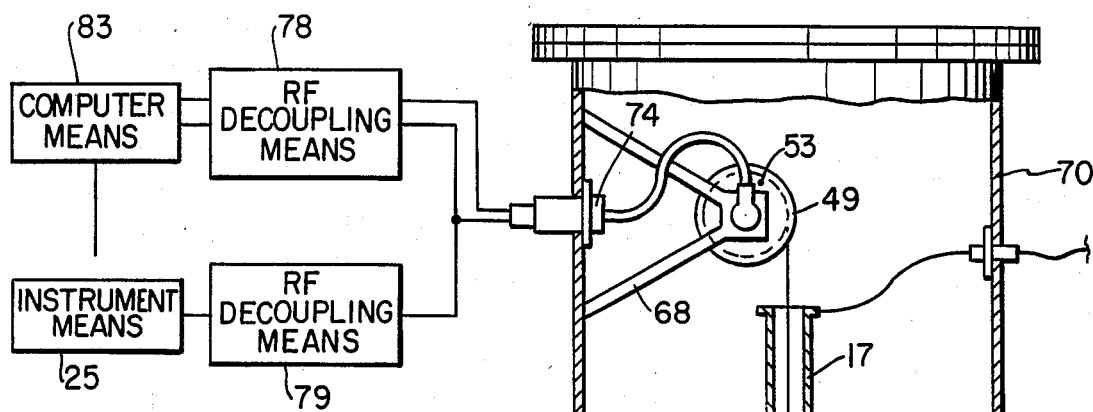
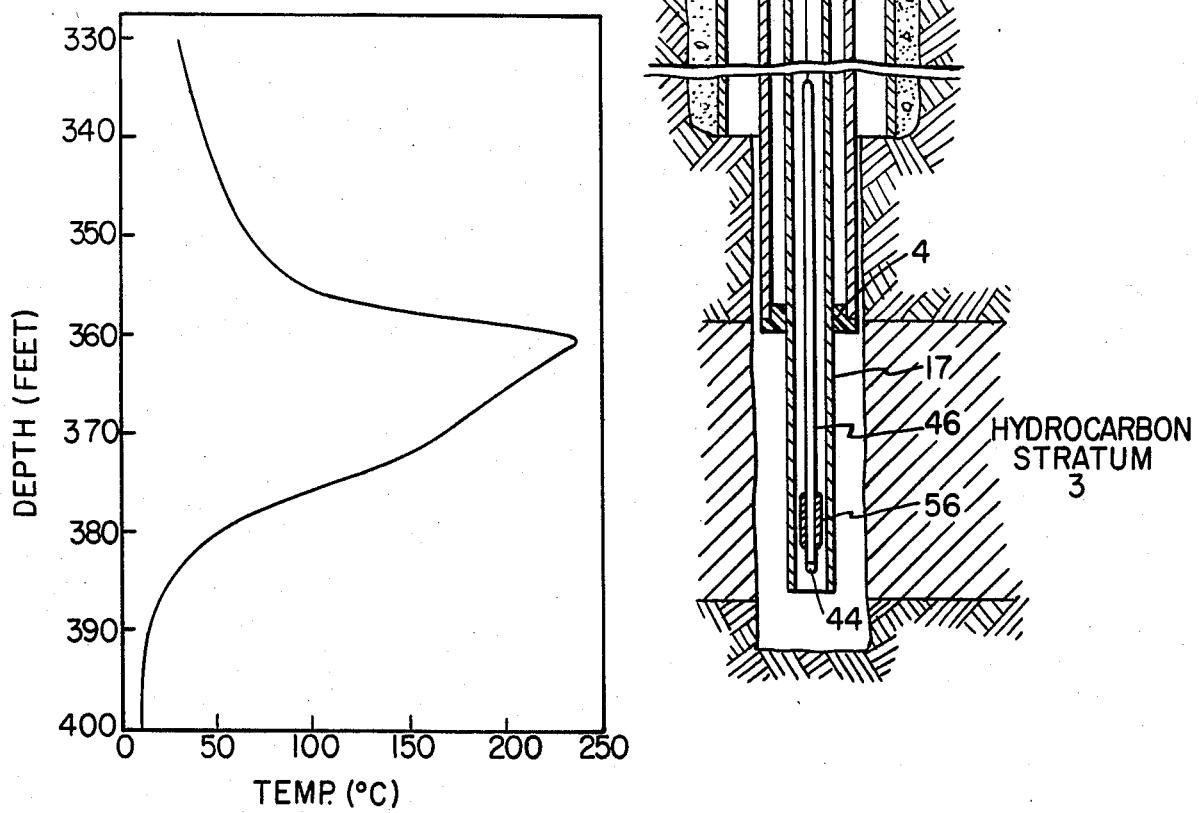

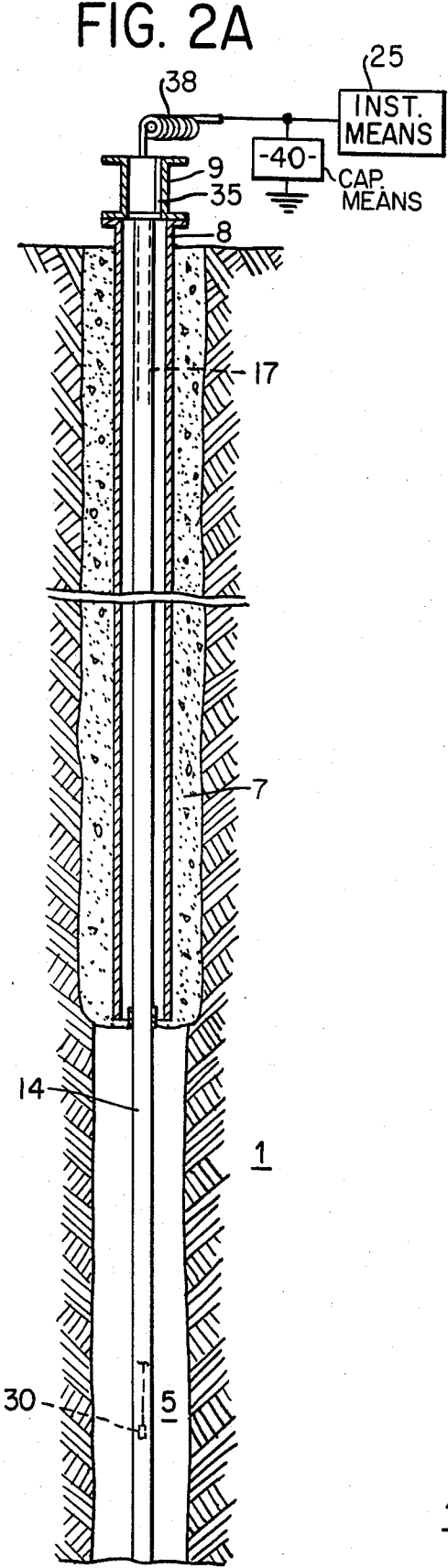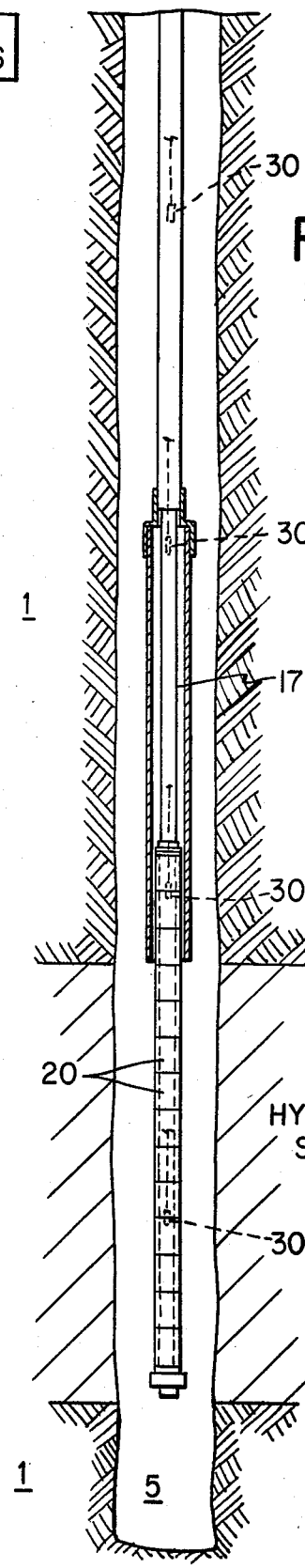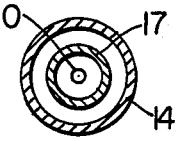

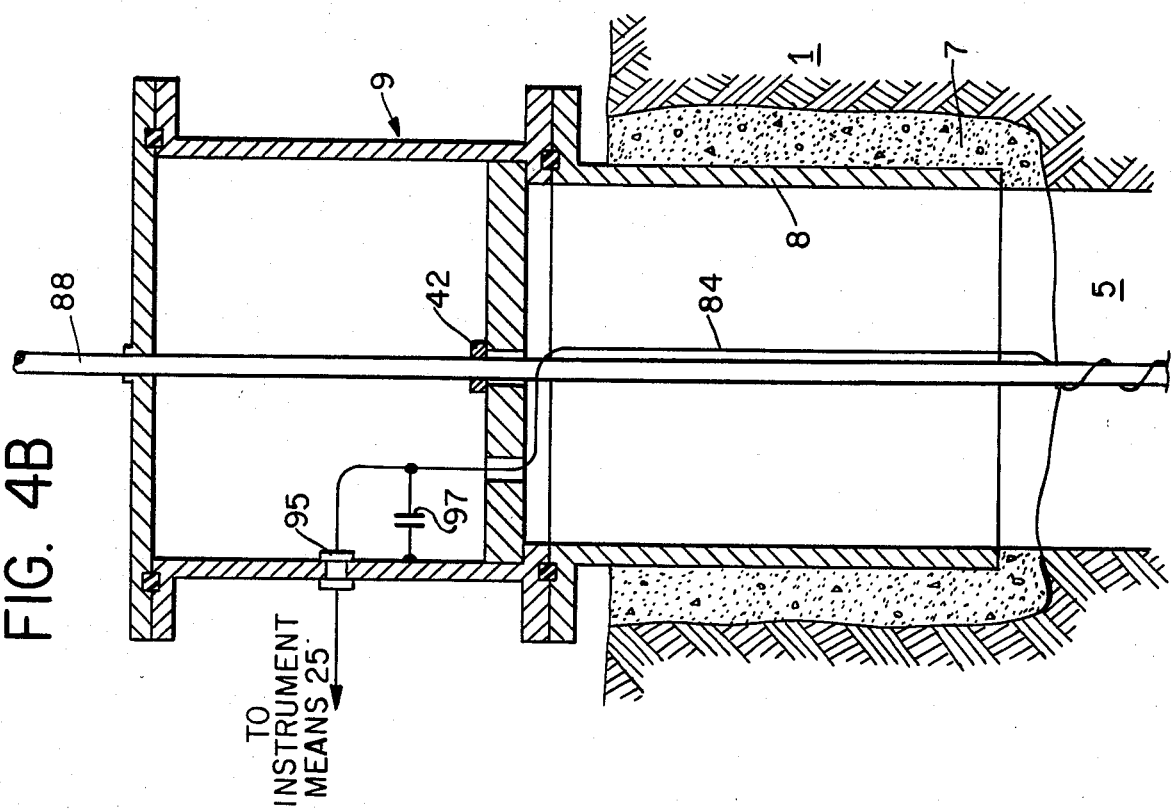
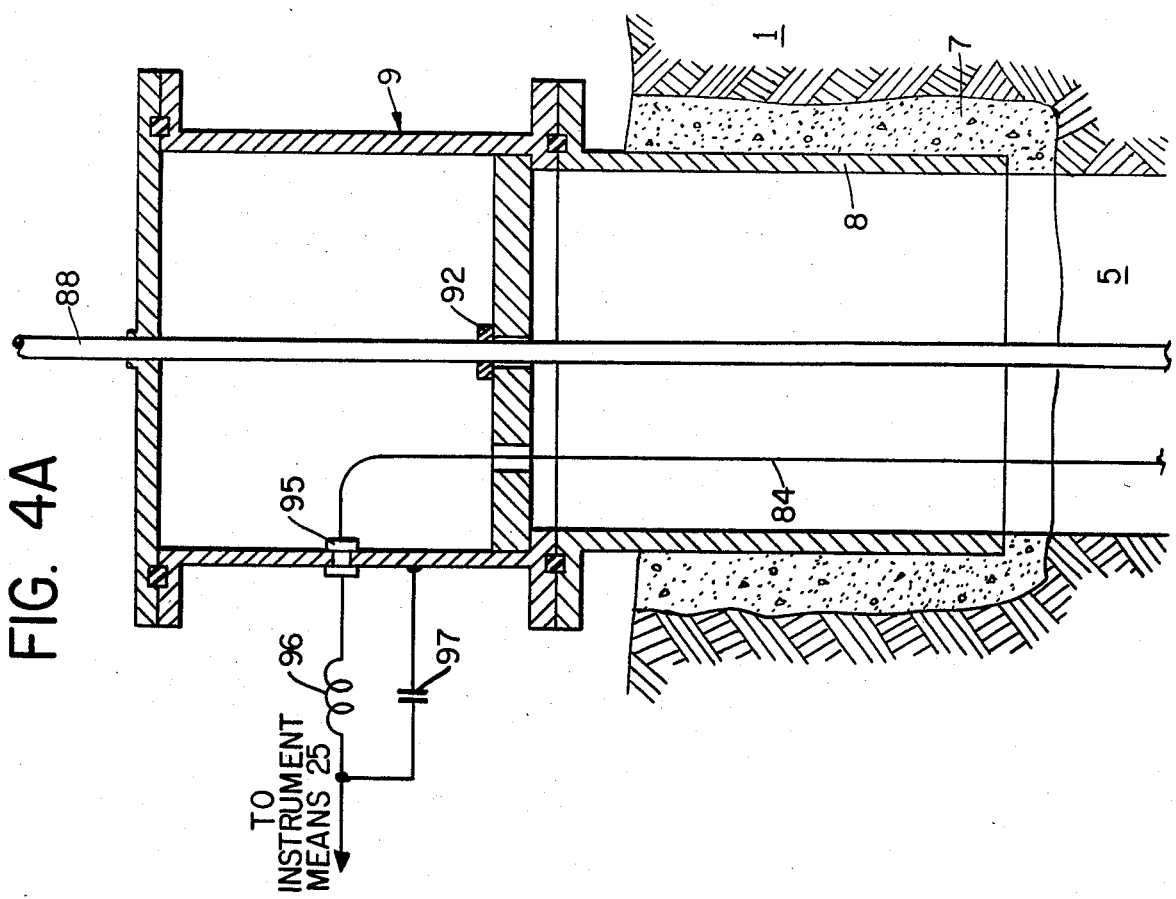

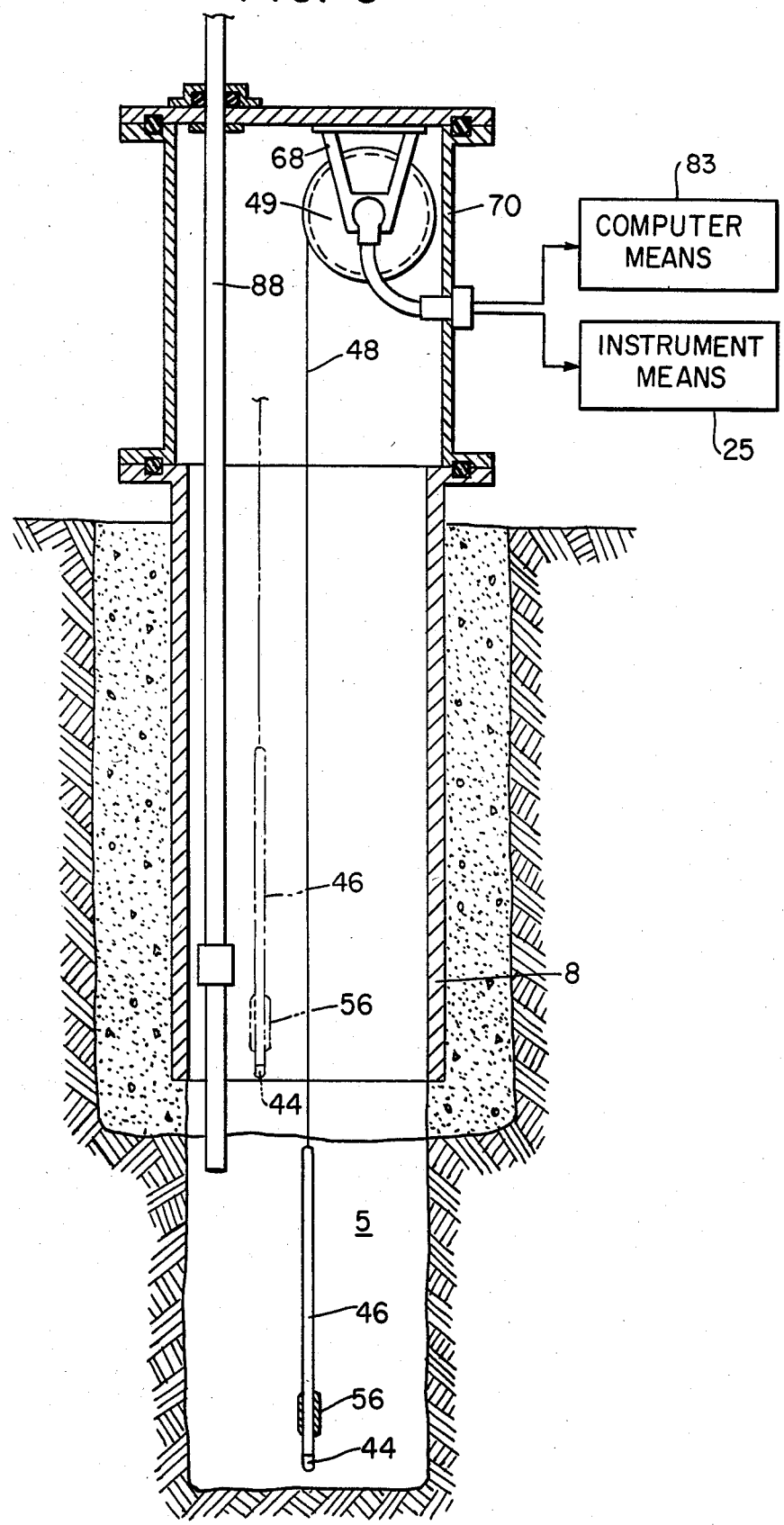

METHOD FOR MEASURING TEMPERATURE OF A HYDROCARBON STRATUM SUBJECTED TO RF ELECTROMAGNETIC ENERGY

BACKGROUND OF THE INVENTION

Field of the Invention

The present invention relates to a method of temperature measurements in general and, more particularly, temperature measurements of substances subjected to radio frequency electromagnetic energy.

SUMMARY OF THE INVENTION

A method for measuring temperatures of a hydrocarbon stratum subjected to RF electromagnetic energy includes in one embodiment sensing the temperature at different positions within an inner conductor of an applicator used to radiate the RF electromagnetic energy into the hydrocarbon stratum. In another embodiment, the temperature measurements are made from a borehole which is utilized to obtain hydrocarbon fluids resulting from the retorting of the hydrocarbon stratum in which the sensing is done in different positions within the producing borehole and in the vicinity of the hydrocarbon stratum. Electrical signals representative of the sensed temperatures are provided. The electrical signals are conducted from the sensing positions to the surface of the earth. An RF voltage which combines with the electrical signals is decoupled from the electrical signals. An indication of the temperatures is provided in accordance with the decoupled electrical signals.

The objects and advantages of the invention will appear more fully hereinafter, from a consideration of the detailed description which follows, taken together with the accompanying drawings wherein several embodiments are illustrated by way of example. It is to be expressly understood, however, that the drawings are for illustrative purposes only, and are not to be construed as defining the limits of the invention.

DESCRIPTION OF THE DRAWINGS

FIG. 1 is a graphical representation of a predicted hydrocarbon stratum temperature profile during RF retorting of the stratum.

FIGS. 2A, 2B and 2C are graphical representations of one embodiment of the present invention for measuring temperature of a hydrocarbon stratum in accordance with the methods of the present invention.

FIG. 3 is a graphical representation accompanied by a simplified block diagram of another embodiment for measuring the temperature in accordance with the method of the present invention in an applicator borehole.

FIGS. 4A and 4B are other embodiments of the method of the present invention for measuring the temperature of a hydrocarbon stratum from a producing borehole.

FIG. 5 is yet another embodiment of measuring the temperature of a hydrocarbon stratum in accordance with the present invention from a producing borehole.

DESCRIPTION OF THE INVENTION

In the Radio Frequency (RF) in-situ retorting of a hydrocarbon stratum, such as oil shale or tar sands, to produce oil, electromagnetic energy at an RF frequency is transmitted in the hydrocarbon stratum from boreholes to retort the stratum thereby producing hydrocarbon fluids. In one embodiment of in-situ RF retorting an applicator radiates the RF energy into the hydrocarbon stratum from a borehole and hydrocarbon fluids may be recovered in that borehole and at least another borehole. Of paramount importance is the sensing of the temperature of the hydrocarbon stratum. The present invention senses the temperature in a borehole which is representative of the temperature of the hydrocarbon stratum. FIG. 1 shows such a temperature plot of temperature versus depth in a borehole. An operator may then control the RF retorting accordingly to improve yield and/or prevent coking. The present invention measures temperature in either type of borehole, i.e., an applicator borehole or a producing borehole.

APPLICATOR BOREHOLE

With reference to FIGS. 2A, 2B and 2C, there is shown an earth formation 1, having a hydrocarbon stratum 3, traversed by a borehole 5 in which a portion of borehole 5 is filled with cement 7 having a metal casing 8 with a well head 9. Suspended in borehole 5 is an RF applicator having an outer conductor 14 and a hollow inner conductor 17 in which RF voltage is provided between coaxial conductors 14 and 17 and electromagnetic energy at an RF frequency is radiated into hydrocarbon stratum 3 from conductor 17. It should be noted that the manner of energizing conductors 14 and 17 is not shown in any of the embodiments as it is not material to an understanding of the present invention. Surrounding and insulating conductor 17 are ceramic insulators 20. Electrically connected to conventional type instrumentation means 25 for indicating and recording measured temperatures is a plurality of thermocouple junctions 30 arranged inside the inner conductor 17. It should be noted that thermocouple junctions 30 and associated thermocouple wire will be at the potential level developed on inner conductor 17 but will not be subjected to the electromagnetic radiation being provided to hydrocarbon stratum 3.

For sake of discussion there is shown a simplified well head 35 in which the thermocouple wires connecting thermocouple junctions 30 to instrument means 25 pass through. The wires are kept in a bundle and are coiled so as to form an inductor 38. Capacitor means 40 connects the connection between coil 38 and instrument means 25 to ground. Capacitor means 40 represents a plurality of capacitors, each capacitor being connected to a corresponding wire and to ground. Together coil 38 and capacitor means 40 form an RF decoupling network, needed because at the location where the thermocouple wires issue from the well head they will be at the potential of the inner conductor with respect to ground, which is a very high RF voltage.

In another applicator well embodiment shown in FIG. 3, a single thermocouple junction 44 and a metal sheath 46 is used. In this regard a thermocouple wire 48 is wound on a drum 49 which is controlled by a stepper motor 53. A weight 56 is attached to sheath 46 of thermocouple junction 44 to give it added weight for lowering into the inner conductor 17. Also shown is an insulator support 62 and an insulator seal 64. A structural support 68 holds drum 49 in position so that thermocouple junction 44 passes down inner conductor 17. Structural member 68 is made from a non-conductive type material. Drum 49 could be mounted on conductor 17 using conductive material. The wires coming out of well head 70 through a connector 74 are provided to RF decoupling means 78 and 79. RF decoupling means 78 and 79 may be of the inductance-capacitance type described throughout this disclosure. RF decoupling means 78 is connected to computer means 83 which may be preprogrammed to control the movement of thermocouple junction 44 and receives depth signals which may be taken by conventional means from the rotation of drum 49 and provides a depth signal to instrument means 25. RF decoupling means 79 provides the electrical connection between instrument means 25 and thermocouple junction 44.

Computer means 83 controls the lowering or raising of thermocouple junction 44 in such a manner when thermocouple junction 44 is in a zone of interest, namely hydrocarbon stratum 3, it will stop at different locations for a long enough time for thermocouple junction 44 to stabilize at the ambient temperature, and then move to the next location after the temperature is recorded as to replace the ten or more thermocouple junctions in the previous embodiment.

A further advantage of this embodiment, computer means 83 may be programmed to make more stops in the vicinity of the maximum temperature so as to better define a temperature peak for a graph of the type shown in FIG. 1.

PRODUCING BOREHOLE

The mode of temperature measurement in a producing well is different than that of an applicator well. Since there is no applicator in a producing well, thermocouple junctions 30 may be lowered into borehole 5. Although thermocouple junctions 30 are not shown in FIG. 4A their wires are shown as line 84. Also shown in FIG. 4A is production tubing 88, used to remove the fluid hydrocarbons from borehole 5, well head 9, and a support 92 which helps to support producing tubing 88.

Producing tubing 88 is normally made of some insulting material such as ceramic, at least in some portion of its length, since it is exposed to both the radiated RF energy from a nearby applicator well and to the resulting high formation temperatures.

Thermocouple wires 84 pass through an insulating connector 95 and, as a bundle, are wound in coil geometry as symbolized by coil 96 and then connect to instrument means 25. Connected to the connections between each coil 96 and instrument means 25 is a corresponding capacitor 97 which is also connected to well head 9 so as to provide in cooperation with the corresponding coil 96, a decoupling effect so that any high voltage indued on wires 84, by the electromagnetic energization of stratum 3 and hence borehole 5 from an applicator well, is decoupled outside of well head 9.

FIG. 4B shows another embodiment in which thermocouple wires 84 are coiled around production tubing 88 to form the inductor for decoupling so that no further inductance is required. Each wire of wire 84 is also connected to the inside well head 9 by a corresponding capacitor 97. Thermocouple wires 84 may then pass out of well head 9 through insulator 95 to be connected to instrument means 25.

In yet another embodiment depicted in FIG. 5, a single thermocouple junction 44 in a metallic sheath 46 again may be raised or lowered using a drum arrangement similar to that in FIG. 3. The significant differences between FIG. 3 and FIG. 5 is that thermocouple junction 44 is not lowered or raised through the production tube but is lowered and raised inside borehole 5 and further there are no RF decoupling circuits. The RF decoupling circuits are not necessary since in this embodiment the measurement of the temperature will be done during intermittent power-down periods of the RF energy into the earth formation. Also shown in FIG. 5 is a storage location (shown by dashed lines) for thermocouple junction 44 during power-on periods. By moving it into the area protected by casing 8, the RF radiation does not reach thermocouple junction 44 nor line 48 and hence does not induce a voltage.

The present invention hereinbefore described is a method of measuring temperature in a borehole during the in-situ RF retorting of a hydrocarbon stratum. In an alternative embodiment temperature is measured during periods of temporary RF power down.

What is claimed is:

1. In the RF retorting of a hydrocarbon stratum in an earth formation, traversed by a borehole with an applicator having a hollow inner conductor and an outer conductor, a method for measuring the temperature of the hydrocarbon stratum in the vicinity of the borehole which comprises the steps of:

sensing the temperatures at different positions within the inner conductor of the applicator in the vicinity of the hydrocarbon stratum with a plurality of thermocouple junctions with each thermocouple junction providing an electrical signal representative of the temperature sensed by the thermocouple junction, conducting the electrical signal from the sensing positions to the surface of the earth with wires connecting each thermocouple junction and being brought up inside the inner conductor of the applicator to the surface;

decoupling an RF voltage from the conducted electrical signals by coiling the wires as a group so that each wire acquires an inductance, and connecting each wire after the coiling of the wires to ground through a capacitor so that a decoupled electrical signal appears at the connection of a wire and a capacitor, and providing an indication of the temperature in accordance with the decoupled electrical signals.

2. In the RF retorting of a hydrocarbon stratum in an earth formation, traversed by a borehole with an applicator having a hollow inner conductor and an outer conductor, a method for measuring the temperature of the hydrocarbon stratum in the vicinity of the borehole which comprises the steps of:

sensing the temperatures at different positions within the inner conductor of the applicator in the vicinity of the hydrocarbon stratum with a plurality of thermocouple junctions with each thermocouple junction providing an electrical signal representative of the temperature sensed by the thermocouple junction, conducting each electrical signal by way of a wire to the surface, connecting an inductance coil to each wire, connecting a corresponding capacitor of a plurality of capacitors to an unconnected end of the coil and to ground so that an RF voltage is decoupled from each of the conducted electrical signals appear at the connections of the coils and the capacitors, and providing an indication of the temperature in accordance with the decoupled electrical signals.

3. In the RF retorting of a hydrocarbon stratum in an earth formation, traversed by a borehole with an applicator having a hollow inner conductor and an outer conductor, a method for measuring the temperature of the hydrocarbon stratum in the vicinity of the borehole which comprises the steps of:

sensing temperatures from within the inner conductor of the applicator in the vicinity of the hydrocarbon stratum with a thermocouple junction which provides an electrical signal representative of the sensed temperature, controlling the thermocouple junction with computer means to sense the temperature at different predetermined positions within the inner conductor of the applicator, conducting the electrical signal from the different said positions of the thermocouple junction to the surface of the earth, decoupling an RF voltage from the conducted electrical signal, and providing an indication of the temperature in accordance with the decoupled electrical signal.

4. A method as described in claim 3 in which the conducting step further includes;

conducting the electrical signal from the thermocouple junction by way of a wire, and the decoupling step includes connecting one end of an inductance coil to the wire and connecting a capacitor to an unconnected end of the inductance coil to ground so that the decoupled electrical signal appears at the connection of the capacitor and the coil.

5. In the RF retorting of a hydrocarbon stratum in an earth formation, in which RF electromagnetic energy is applied to the hydrocarbon stratum from an applicator in a borehole traversing the hydrocarbon stratum and fluid hydrocarbons are obtained with production tubing in a producing borehole traversing the hydrocarbon stratum, a method for measuring the temperature of the hydrocarbon stratum in the vicinity of the producing borehole which comprises the steps of:

sensing the temperatures at different positions within the producing borehole in the vicinity of the hydrocarbon stratum with a plurality of thermocouple junctions, with each thermocouple junction providing an electrical signal representative of the temperature sensed by the thermocouple junction, conducting the electrical signals from the thermocouple junctions to the surface of the earth formation with wires connecting each thermocouple junction to the surface equipment, decoupling an RF voltage from the conducted electrical signals by coiling the wires as a group around the production tubing so that each wire acquires an inductance, and connecting each wire at the surface to ground through a capacitor so that a decoupled electrical signal appears at the connection of a wire and a capacitor, and providing an indication of the temperatures in accordance with the decoupled electrical signals.

6. In the RF retorting of a hydrocarbon stratum in an earth formation, in which RF electromagnetic energy is applied to the hydrocarbon stratum with an applicator from an applicator borehole traversing the hydrocarbon stratum and fluid hydrocarbons are obtained with production tubing in a producing borehole traversing the hydrocarbon stratum, a method for measuring the temperature of the hydrocarbon stratum in the vicinity of the producing borehole which comprises the steps of:

sensing the temperatures at different positions within the producing borehole in the vicinity of the hydrocarbon stratum with a plurality of thermocouple junctions with each thermocouple junction providing an electrical signal representative of the temperature sensed by the thermocouple junction, conducting each electrical signal by way of a wire to the surface;

connecting one end of an inductance coil to each wire, connecting a capacitor to an unconnected end of each coil and to ground so that an RF voltage is decoupled from each of the conducted electrical signals appear at the connections of the coils and the capacitors, and providing an indication of the temperatures in accordance with the decoupled electrical signals.

7. In the RF retorting of a hydrocarbon stratum in an earth formation, in which RF electromagnetic energy is applied to the hydrocarbon stratum with an applicator from an applicator borehole traversing the hydrocarbon stratum and fluid hydrocarbons are obtained with production tubing in a producing borehole traversing the hydrocarbon stratum, a method for measuring the temperature of the hydrocarbon stratum in the vicinity of the producing borehole which comprises the steps of:

sensing the temperature within the producing borehole in the vicinity of the hydrocarbon stratum with a thermocouple junction providing an electrical signal representative of the temperature sensed by the thermocouple junction, controlling the thermocouple junction with computer means to sense the temperature at different predetermined positions within the producing borehole, conducting the electrical signal from the different said positions of the thermocouple junction to the surface of the earth formation, decoupling an RF voltage from the conducted electrical signal, and providing an indication of the temperatures in accordance with the decoupled electrical signal.

8. A method as described in claim 7 in which the conducting step further includes;

conducting the electrical signal from the thermocouple junction by way of a wire, and the decoupling step includes connecting one end of an inductance coil to the wire and connecting a capacitor to an unconnected end of the inductance coil to ground so that the decoupled electrical 15 signal appears at the connection of the capacitor and the coil.

9. In the RF retorting of a hydrocarbon stratum in an earth formation in which RF electromagnetic energy is applied to the hydrocarbon stratum with an applicator from one borehole traversing the hydrocarbon stratum for a predetermined period of time and then not transmitted or radiated into the hydrocarbon stratum for another period of time and where fluid hydrocarbons are obtained with production tubing in a producing borehole traversing the hydrocarbon stratum in which the upper portion of the producing borehole has a metal casing, a method for measuring the temperature of the hydrocarbon stratum in the vicinity of the producing borehole which comprises the steps of;

sensing the temperature at different positions within the producing borehole in the vicinity of the hydrocarbon stratum when the RF electromagnetic energy is not being transmitted or radiated into the hydrocarbon stratum with a thermocouple junction, which provides an electrical signal repesentative of the temperatures sensed by the thermocouple junction, moving the thermocouple junction at a predetermined rate with predetermined stops at positions in the vicinity of the hydrocarbon stratum, conducting the electrical signal from the sensing positions to the surface of the earth formation, and providing an indication of the temperatures in accordance with the conducted electrical signal.

10. A method as described in claim 9 further comprising the step of deriving a temperature profile for the hydrocarbon stratum in the vicinity of the producing borehole.

11. A method as described in claim 10 further comprising the step of positioning the thermocouple junction within that portion of the borehole having the metal casing when RF electromagnetic energy is being radiated or transmitted into the hydrocarbon stratum.

* * * * *